Oct. 6, 1936.                    T. H. JACOB                    2,056,523
                              DRAWBAR FOR TRAILERS
                         Filed Feb. 20, 1935          3 Sheets-Sheet 1
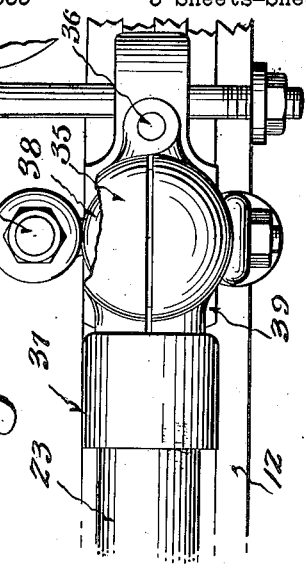
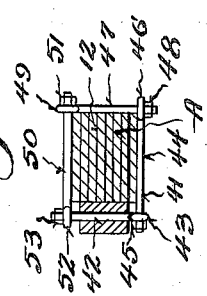
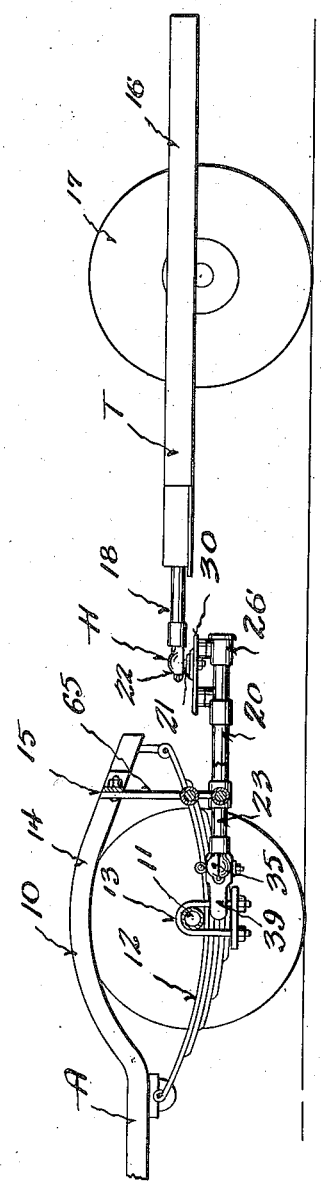
Inventor
T. H. Jacob Oct. 6, 1936.   T. H. JACOB   2,056,523
DRAWBAR FOR TRAILERS
Filed Feb. 20, 1935   3 Sheets-Sheet 2
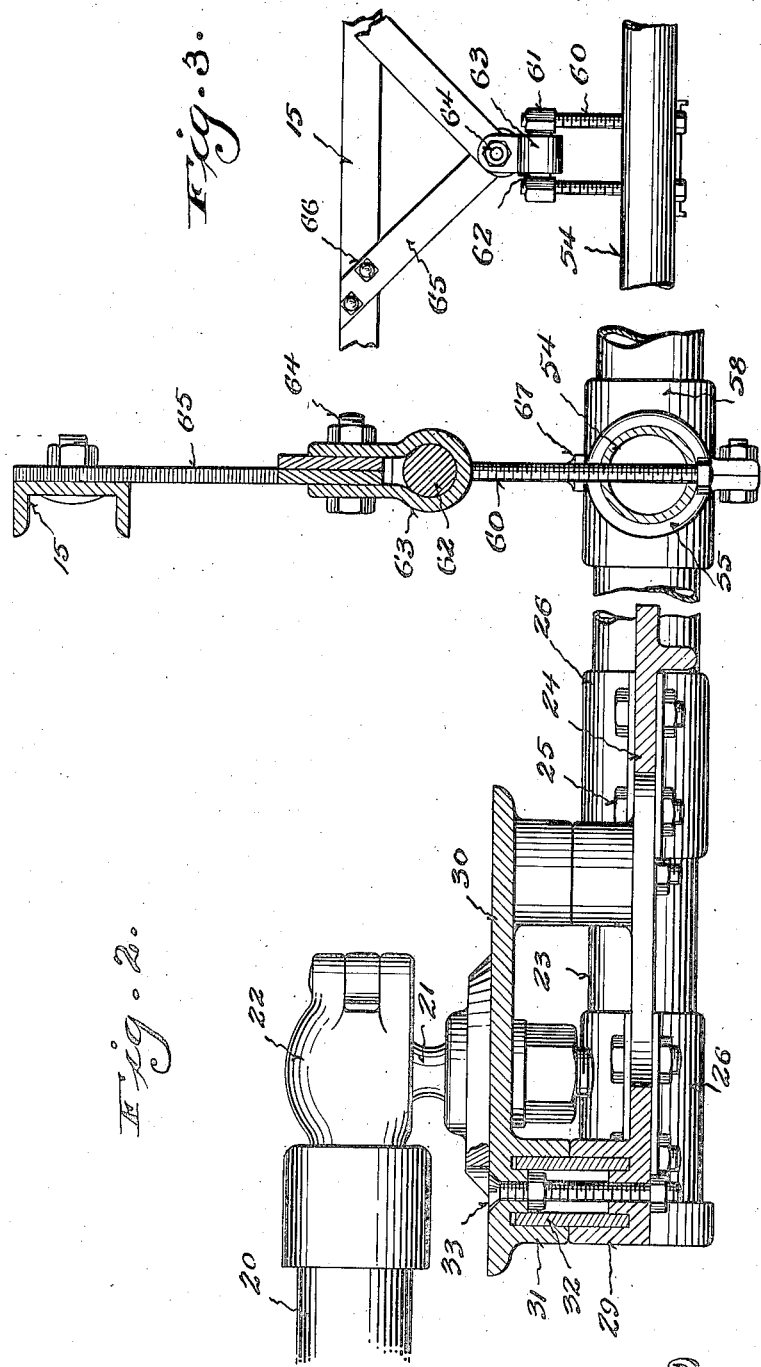

Oct. 6, 1936.  T. H. JACOB  2,056,523
DRAWBAR FOR TRAILERS
Filed Feb. 20, 1935  3 Sheets-Sheet 3
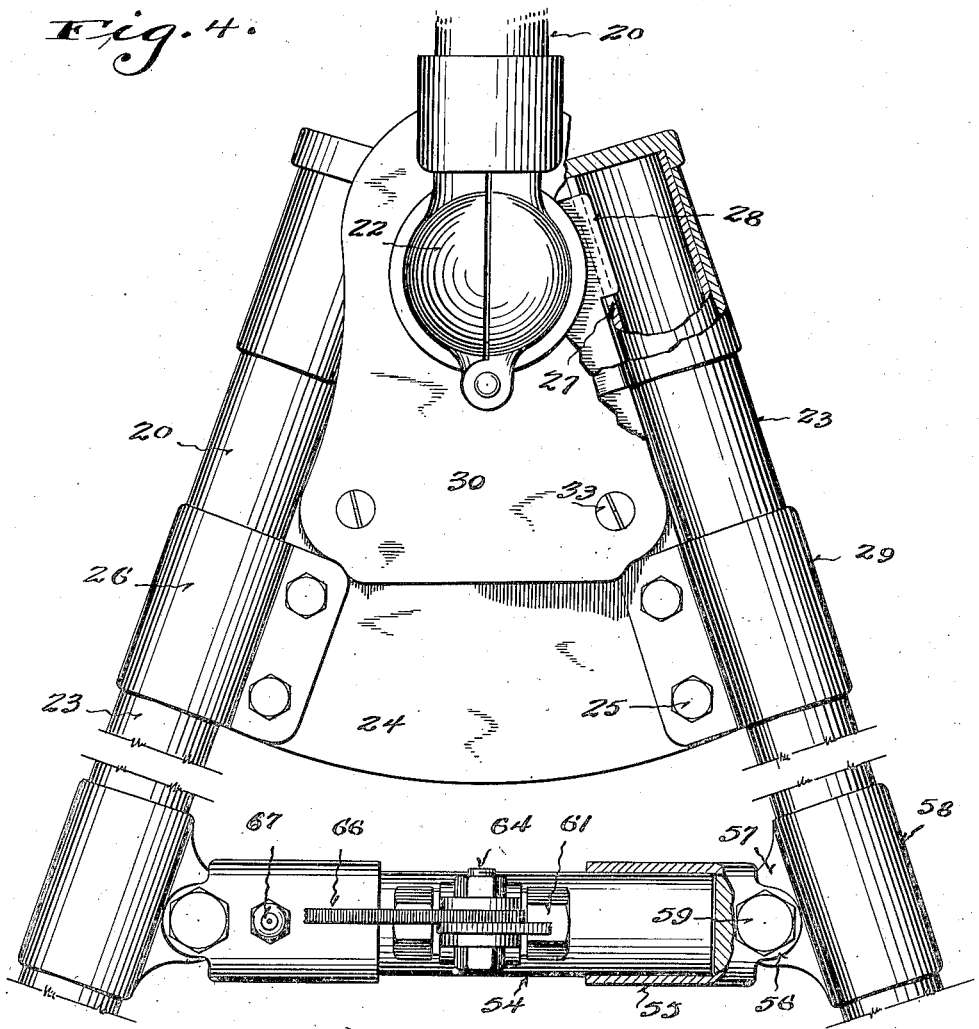
Inventor
T-H-Jacob
By
Attorneys Patented Oct. 6, 1936

2,056,523

UNITED STATES PATENT OFFICE 2,056,523

DRAWBAR FOR TRAILERS

Thomas H. Jacob, Wausau, Wis.

Application February 20, 1935, Serial No. 7,397

6 Claims. (Cl. 280—33.44)

This invention appertains to trailer hitches, and more particularly to novel means for connecting the draw-bar of the hitch to an automobile or other drawing vehicle.

Modern automobiles with their stream lines, "Beaver Tail" backs, built-in trunks, etc., make it very difficult to get at the frame of the car to attach a trailer draw-bar. Then too, there is seldom any cross member on the frame, that can be reached, that is strong enough to withstand the surge of the trailer incident to sudden stopping and starting. It is also bad engineering practice to weaken the frame of a car by the boring of holes and the like therein.

My present invention, therefore, provides an improved and novel means for connecting the draw-bar to the drawing vehicle without the necessity of punching or drilling any holes, and which can be conveniently and quickly applied to a modern type of automobile, irrespective of the body overhang in the back.

Another salient object of my invention is to provide means whereby the entire draw-bar can be readily removed from an automobile, so that when the trailer is to be laid up for a considerable length of time, no unsightly parts are exposed to view on the automobile to mar the beauty thereof.

A further object of my invention is to provide novel means for connecting the draw-bar below the vehicle frame and directly to the supporting springs adjacent to their points of connection with the rear axle, whereby to effectively relieve the frame from stress incident to the surging back and forth of the trailer, and to prevent the transmission of body vibrations to the trailer hitch.

A further important object of my invention is to provide a novel draw-bar which can not only be easily applied to a modern automobile, but which can be readily adjusted to suit varying conditions, such as different types of automobiles and different sizes of trailers, etc.

A still further object of my invention is to provide novel means for connecting the hitch plate with the draw-bar, whereby a strong and durable connection will be had, and whereby the hitch plate can be raised and lowered to suit the height of the trailer or its tongue.

With these and other objects in view, the invention consists in the novel construction, arrangement, and formation of parts, as will be hereinafter more specifically described, claimed, and illustrated in the accompanying drawings, in which drawings:—

Figure 1 is a side elevation of my improved hitch, with parts thereof broken away and in section, showing the same attached to a trailer and a drawing vehicle.

Figure 2 is an enlarged, fragmentary sectional view illustrating the draw-bar and the connection of the hitch plate therewith, the view also showing the support for the draw-bar connected with a part of the frame of the drawing vehicle.

Figure 3 is a fragmentary detail view taken on a smaller scale than Figure 2, illustrating the means of suspending the draw-bar from a part of the vehicle frame.

Figure 4 is a top plan view of my improved draw-bar, with parts thereof broken away and in section, and illustrating the novel means of connecting one of the reach beams of the draw-bar with the spring of a drawing vehicle, the view being drawn on the same scale as Figure 2.

Figure 5 is a fragmentary, detail side elevation illustrating the novel means employed for connecting one of the reach beams, or poles, of the draw-bar with the vehicle spring.

Figure 6 is a detail transverse section illustrating the clip in detail for connection with the vehicle spring, the view being taken substantially on the line 6—6 of Figure 4.

Referring to the drawings in detail, wherein similar reference characters designate corresponding parts through the several views, the letter H indicates my improved hitch for connecting a trailer T with an automobile A or other drawing vehicle.

The drawing vehicle, or automobile, A forms no part of the present invention, and can be considered as of any conventional type, and, as shown, the same includes the automobile frame 10, the rear axle 11, and the connecting springs 12. The springs 12 are connected at their central portions to the axle 11 by means of spring clips 13. The frame 10 can embody longitudinally extending channel beams 14 connected adjacent to their rear ends by a cross-beam 15.

The trailer T can also be of any desired character, and the same includes a rigid frame 16, which is supported by the wheels 17. The forward end of the trailer frame 16 has connected therewith the trailer tongue 18, which forms a part of the hitch H. This tongue 18 can be of any preferred type best suited to the kind of trailer being drawn.

The hitch H includes the novel draw-bar 20, which forms the salient feature of the present invention, and the tongue 18 is connected to the draw-bar 20 by means of a ball 21 and socket 22.

The socket 22 is carried by the tongue, and the ball 21 is carried by the draw-bar.

Referring more specifically to my improved draw-bar, the same includes a pair of reach poles, or beams, 23, which converge toward the rear ends. The reach poles, or beams, 23 are preferably formed from steel tubing, and are cut to the length desired to agree with the character of the vehicle with which the same are to be associated.

The converging ends of the reach poles, or beams, 23 are rigidly connected together by means of a head-plate 24, which can be in the nature of a casting. This head-plate can be of a substantially triangular shape in plan, and lies between the reach beams 23, and the side edges of the head-plate have securely bolted thereto, as at 25, cuffs 26, which are firmly clamped about said reach beams. If desired, the tubes from which the reach beams are made can be slotted, as at 27, to receive ears, or tongues, 28 formed on the side edges of the head-plate, whereby turning movement of the tubes will be prevented. The upper face of the head-plate 24 has cast thereon hollow bosses 29, for a purpose which will be later set forth.

Arranged above and securely bolted to the head-plate 24 is the hitch plate 30, which can be of the character shown in my co-pending application entitlted "Combined trailer brake and hitch," Serial No. 7,398, filed February 20, 1935.

In the present showing, the hitch plate 30 has cast on its lower surface depending hollow bosses 31, which are adapted to aline with the bosses 29 on the head-plate. Spacing and connecting sleeves 32 are received within the bosses 29 and 31, and these sleeves are preferably formed from steel. Obviously, by providing longer sleeves 32, the hitch plate 30 can be spaced the desired distance from the head-plate 24.

Bolts 33 extend through the plates 24 and 30, and through the axial center of the bosses to firmly and rigidly connect said plates. The plate 30 has bolted thereto the ball 21, which, as stated, is received within the socket 22 of the trailer tongue 20.

The forward ends of the reach bars, or tubes, 23 are connected in a novel manner with the springs 12 of the automobile A, and for this connection I utilize balls and sockets which are of the same character as the ball and socket 21 and 22, and preferably of the type illustrated in my prior Patents Nos. 1,927,591, and 1,977,065, issued to me September 19, 1933, and October 16, 1934, respectively.

Thus, the forward end of each reach bar 23 carries a two-part socket 35. The sections of the socket are pivotally connected together, as at 36, and are normally held in their closed position by means of a sliding spring-pressed sleeve 37 mounted on a reach bar 23.

Each socket 35 is adapted to receive and engage a ball 38, and each ball is formed on a flat foot, or attaching, plate, 39 and extends laterally from the inner face thereof. The foot, or attaching, plates, 39 are placed up against the inner faces of the vehicle springs 12 adjacent to the axle 11, and the front ends of the plates 39 are hooked or provided with recesses 40 for engaging over the spring clips 13.

The foot plates are firmly connected with the spring 12 by means of clips 41. Each of the clips 41 includes a vertical bolt 42, which extends through the adjacent foot plate. The lower end of the bolt 42 is provided with an eye 43, through which extends a bottom transverse bolt 44. This transverse bolt 44 engages the bottom of the spring and is secured in place by a nut 45. The outer end of the bottom bolt 44 is provided with an eye 46, through which extends a vertical bolt 47, which engages the outer side face of the spring 12. This bolt is held in place by means of a nut 48.

The upper end of the bolt 47 is provided with an eye 49, through which extends the top transverse bolt 50. The bolt 50 is held in place by a nut 51, and the same is provided with an eye 52, through which extends the vertical bolt 42. This bolt 42 is held in place by means of a nut 53. Obviously, by tightening the nuts 45, 48, 51, and 53, the clip can be firmly clamped in place.

From the description so far, it can be seen that the pull of the trailer does not come on the frame of the automobile, and that the draw-bar is connected directly to the springs.

If preferred, the draw-bar can be suspended from the frame of the automobile A, and the means employed embodies a transversely extending tube 54. The ends of the tubing are rotatably mounted within sleeves 55, and these sleeves have their outer ends provided with ears 56. The ears 56 can be placed on the top or bottom of ears 57 formed on split cuffs, or sleeves, 58. Suitable fastening bolts 59 are employed for connecting the ears 56 of the sleeves 55 with the ears 57 of the cuffs 58. As stated, the ears 56 can either be placed on the tops of or on the bottoms of the ears 57, so as to obtain a desired adjustment.

The central portion of the tube 54 has threaded therethrough a pair of adjusting bolts 60, which are in turn threaded through the polygonal terminals 61 of a cross-shaft 62. Rockably mounted on the cross-shaft 62 is a sleeve 63. This sleeve 63 has connected thereto by means of a bolt 64 attaching links 65. The upper ends of the links 65 can be bolted, as at 66, to the transverse member 15 of the automobile frame. Thus, the frame of the automobile can be utilized for supporting a portion of the weight of the trailer, but the surge of the trailer is transmitted to the springs.

By means of the connection just described between the draw-bar and the frame of the vehicle, a pivoted connection is had, in that the tube 43 is rotatably mounted in the sleeves 55, and sleeve 63 is rockably mounted on the cross-shaft 62. Suitable grease fittings 67 can be carried by the sleeves 55, so as to permit the thorough lubrication thereof. If so desired, similar fittings can be carried by the sockets 22 and 35.

Normally, when the trailer is in everyday use, the same is merely disconnected from the automobile A by means of the socket 22, but when the trailer is to be laid up for a long time, the draw-bar is removed from the vehicle by disconnecting the sockets 35 from the balls 38, and by removing the bolt 64. Obviously, with my type of draw-bar, a trailer can be readily hitched to an automobile, irrespective of the overhang of the rear end of the automobile body.

The draw-bar has been especially designed to effectively distribute the pull of the trailer and the weight of the tailer to the various parts of the drawing vehicle, and the construction of the draw-bar is such that the same acts in the nature of a "snubber" to prevent rebound between the body and the axle. This is accomplished by the pivotal connection between the draw-bar and the vehicle frame, and the connection between the draw-bar and the vehicle springs. When the automobile body compresses the vehicle springs, the connection between the draw-bar and the frame of the vehicle eliminates unnecessary rebound.

Changes in details may be made without departing from the spirit or the scope of this invention, but what I claim as new is:—

1. The combination with a drawing vehicle including a frame, an axle, leaf springs connecting the axle with the frame, and clips securing the springs to the axle, of a draw-bar including a pair of converging reach beams, a head-plate connecting the converging ends of the beams together, attaching feet engaging the sides of the leaf springs adjacent to the axle and having hooks engaging over the clips, means rigidly securing the feet to the springs, and means detachably connecting the forward ends of the reach beams to the feet.

2. The combination with a drawing vehicle including a frame, an axle, leaf springs connecting the axle with the frame, and clips securing the springs to the axle, of a draw-bar including a pair of converging reach beams, a head-plate connecting the converging ends of the beams together, attaching feet engaging the sides of the leaf springs adjacent to the axle and having hooks engaging over the clips, means rigidly securing the feet to the springs, and means detachably connecting the forward ends of the reach beams to the feet, said means including a ball and socket joint.

3. The combination with a drawing vehicle including a frame having longitudinally extending channel beams and a cross member, an axle, springs for connecting the axle with the frame, and clips rigidly securing the central part of the springs to the axle, of a draw-bar including converging reach beams, a head-plate connecting the converging ends of the reach beams together, attaching feet, clips rigidly connecting the attaching feet to the springs, the feet being hooked over the spring clips, means detachably connecting the forward ends of the reach beams to the feet, and means for suspending the draw-bar from the cross member of the frame.

4. The combination with a drawing vehicle including a frame having longitudinally extending side channel beams and a connecting cross member, an axle, springs connecting the axle with the frame, of a draw-bar including converging reach beams, a head-plate connecting the converging ends of the reach beams together, attaching feet rigidly connected with the vehicle springs adjacent to their point of connection with the axle, a ball and socket connection between the forward ends of the reach beams and the attaching feet, a cross tube rotatably carried by the reach beams in spaced relation to the head-plate, a cross-shaft, means adjustably connecting the cross-shaft with the rotatable tube, a sleeve rockably mounted on the cross-shaft, and connecting links secured to the sleeve and the cross member of the vehicle frame.

5. In a trailer hitch, a draw-bar including a head-plate, a hitch plate mounted above the head-plate, the adjacent faces of the head and hitch plates being provided with alined hollow bosses, spacing sleeves fitted in said bosses, and means rigidly clamping the plates together.

6. In a trailer hitch, a draw-bar, a head-plate forming a part of the draw-bar, a trailer tongue, a hitch plate mounted above the head-plate, a ball and socket connection between the hitch plate and the tongue, alined hollow bosses formed on the inner faces of the hitch plate and the head-plate, spacing sleeves fitted in the bosses between the plates, and bolts connecting said plates together and extending through the bosses and spacing sleeves.

THOMAS H. JACOB.